US012744282B2

(12) United States Patent
Yersak et al.

(10) Patent No.: US 12,744,282 B2
(45) Date of Patent: Sep. 22, 2026

(54) BICONTINUOUS SEPARATING LAYERS FOR SOLID-STATE BATTERIES AND METHODS OF FORMING THE SAME

(71) Applicant: GM GLOBAL TECHNOLOGY OPERATIONS LLC, Detroit, MI (US)

(72) Inventors: Thomas A. Yersak, Royal Oak, MI (US); Ion C. Halalay, Grosse Pointe Park, MI (US); Yubin Zhang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 886 days.

(21) Appl. No.: 17/955,151

(22) Filed: Sep. 28, 2022

(65) Prior Publication Data

US 2024/0106072 A1 Mar. 28, 2024

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 10/0562* (2013.01);
(Continued)

(58) Field of Classification Search
CPC ............. H01M 50/406; H01M 50/417; H01M 50/423; H01M 50/437; H01M 50/446;
(Continued)

(56) References Cited

U.S. PATENT DOCUMENTS 10,680,281 B2 6/2020 Yersak et al.
10,734,673 B2 8/2020 Yersak et al.
(Continued)

FOREIGN PATENT DOCUMENTS

CN 106471666 A * 3/2017 ........ H01M 10/0585
CN 117791041 A 3/2024
DE 102023111255 A1 3/2024

OTHER PUBLICATIONS

Machine translation of CN 106471666 A (Year: 2017).*
(Continued)

*Primary Examiner* — Kevin P Kerns
(74) *Attorney, Agent, or Firm* — Harness, Dickey & Pierce, PLC

(57) ABSTRACT

A bicontinuous separating layer includes a separating matrix having pores and a solid-state electrolyte disposed in the pores of the separating matrix. In certain variations, the bicontinuous separating layer is prepared by contacting a solid-state electrolyte liquid-state precursor with the separating matrix and heating the infiltrated separating matrix to a temperature between about 25° C. and about 300° C. The solid-state electrolyte liquid-state precursor includes a solvent and a solid-state electrolyte powder or a solid-state electrolyte precursor. In other variations, the bicontinuous separating layer may be prepared by contacting a solid-state electrolyte powder with a separating matrix to form a physical mixture and heating the physical mixture to a temperature between about 240° C. and about 500° C., where the separating matrix is defined by a polymer having a melting temperature greater than about 215° C., and the solid-state electrolyte has a melting temperature greater than about 300° C.

12 Claims, 3 Drawing Sheets

(51) Int. Cl.

| | |
|---|---|
| ***H01M 10/0562*** | (2010.01) |
| ***H01M 50/406*** | (2021.01) |
| ***H01M 50/417*** | (2021.01) |
| ***H01M 50/423*** | (2021.01) |
| ***H01M 50/437*** | (2021.01) |
| ***H01M 50/491*** | (2021.01) |
| ***H01M 50/497*** | (2021.01) |

(52) U.S. Cl.
CPC ....... *H01M 50/406* (2021.01); *H01M 50/417* (2021.01); *H01M 50/423* (2021.01); *H01M 50/437* (2021.01); *H01M 50/491* (2021.01); *H01M 50/497* (2021.01); *H01M 2300/008* (2013.01)

(58) Field of Classification Search
CPC ............. H01M 50/491; H01M 50/497; H01M 10/052; H01M 10/0562; H01M 2300/008
USPC ......................................... 429/321, 322, 323
See application file for complete search history.

(56) References Cited

U.S. PATENT DOCUMENTS

2019/0334178 A1* 10/2019 Senoue ............. H01M 10/0525
2019/0393549 A1 12/2019 Yersak et al.

OTHER PUBLICATIONS

Jurgen Janek et al.; “A solid future for battery development”; Nature Energy, vol. 1; Sep. 8, 2016; 4 pages.

Yoon Seok Jung et al.; “Improved Functionality of Lithium-Ion Batteries Enabled by Atomic Layer Deposition on the Porous Microstructure of Polymer Separators and Coating Electrodes”; Advanced Energy Materials; 2012 pp. 1022-1027.

Wenjuan Mattis et al.; “New High-Energy & Safe Battery Technology with Extreme Fast Charging Capability for Automotive Applications”; USDOE Energy Efficiency & Renewable Energy—Vehicle Technology Office; May 2021; 31 pages.

Yangyang Xi et al.; “Membrane Separators Coated by TiO2-PMMA with Low Thermal Shrinkage Rate for Lithium-Ion Batteries”; International Journal of Electrochemical Science, 12; May 12, 2017; pp. 5421-5430.

Yiran Xiao et al.; “Electrolyte melt infiltration for scalable manufacturing of inorganic all-solid-state lithium-ion batteries”; Nature Materials, vol. 20; Jul. 2021; pp. 984-990.

J. Xu et al.; “Liquid-involved synthesis and processing of sulfide-based solid electrolytes, electrodes, and all-solid-state batteries”; Materials Today Nano, 8; Jul. 30, 2019; 37 pages.

Hirotada Gamo et al.; “Solution Processing via Dynamic Sulfide Radical Anions for Sulfide Solid Electrolytes”; Advanced Energy and Sustainability Research; Apr. 2022; 9 pages.

* cited by examiner

BICONTINUOUS SEPARATING LAYERS FOR SOLID-STATE BATTERIES AND METHODS OF FORMING THE SAME

GOVERNMENT FUNDING

This invention was made with government support under Agreement No. DE-EE0008857 awarded by the Department of Energy. The Government may have certain rights in the invention.

INTRODUCTION

This section provides background information related to the present disclosure which is not necessarily prior art.

Electrochemical energy storage devices, such as lithium-ion and/or sodium-ion batteries, can be used in a variety of products, including automotive products such as start-stop systems (e.g., 12V start-stop systems), battery-assisted systems ("μVBAS"), Hybrid Electric Vehicles ("HEVs"), and Electric Vehicles ("EVs"). Typical lithium-ion and/or sodium-ion batteries include two electrodes and an electrolyte component and/or separator. One of the two electrodes can serve as a positive electrode or cathode, and the other electrode can serve as a negative electrode or anode. A separator filled with a liquid or solid electrolyte may be disposed between the negative and positive electrodes. The electrolyte is suitable for conducting lithium ions and/or sodium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Many different materials may be used to create components for a lithium-ion and/or sodium-ion battery. For example, for solid-state batteries, solid-state electrolytes are often used in placed of porous (e.g., plastic film) separators. However, solid-state electrolytes are often very thick (e.g., greater than about 100 micrometers (μm)), which reduces energy densities for solid-state batteries. Further, in the instance of negative electrodes including lithium metals, the lithium metal often cause short circuits in solid-state batteries by depositing (e.g., plating) in pores and cracks, and also along grain boundaries. Accordingly, it would be desirable to develop improved battery materials, and more particularly separating layers for solid-state batteries, that can address these challenges.

SUMMARY

This section provides a general summary of the disclosure, and is not a comprehensive disclosure of its full scope or all of its features.

The present disclosure relates to solid-state batteries, and more specifically, to bicontinuous separating layers for solid-state batteries, as well as to methods of making and using the same.

In various aspects, the present disclosure provides a bicontinuous separating layer for an electrochemical cell. The bicontinuous separating layer may include a separating matrix having pores and a solid-state electrolyte disposed in at least a portion of the pores of the separating matrix. The bicontinuous separating layer may have an ionic conductivity greater than or equal to about $2.5\times10^{-5}$ S/cm at 25° C.

In one aspect, the separating matrix may have a porosity greater than or equal to about 30 vol. % to less than or equal to about 80 vol. %, and the solid-state electrolyte may occupy greater than or equal to about 60% of a total porosity of the separating matrix.

In one aspect, the bicontinuous separating layer may have a Gurley number greater or equal to about 300 s/100 cc, and an areal resistance greater than or equal to about 2 $\Omega\cdot cm^2$ to less than or equal to about 100 $\Omega\cdot cm^2$.

In one aspect, an average pore diameter for the pores of the separating matrix may be greater than or equal to about 0.03 micrometers to less than or equal to about 1 micrometer, and an average particle size for the solid-state electrolyte may be greater than or equal to about 0.03 micrometers to less than or equal to about 1 micrometer.

In one aspect, a thickness of the bicontinuous separating layer may be defined by the separating matrix and an average thickness of the separating matrix may be greater than or equal to about 10 micrometers to less than or equal to about 100 micrometers.

In one aspect, the separating matrix may include one or more of: aramid, ultra-high molecular weight polyethylene, inorganic fibers, polymethyl pentene, or any combination thereof.

In one aspect, the solid-state electrolyte may include a solid-state electrolyte material selected from the group consisting of: $Li_3PS_4$, $Li_7P_3S_{11}$, $Li_7P_3S_{(1-x)}O_x$ (where $0\leq x\leq1.25$), $Li_6PS_5M$ (where M is selected from the group consisting of: chloride (Cl), bromide (Br), iodine (I), and combinations thereof), $Li_4PS_4M$ (where M is selected from the group consisting of: chloride (Cl), bromide (Br), iodine (I), and combinations thereof), $Na_3PS_4$, $Na_{(3-2x)}PS_{(4-x)}Se_x$ (where $0\leq x\leq0.1$), and combinations thereof.

In one aspect, the separating matrix may include the ultra-high molecular weight polyethylene, and the ultra-high molecular weight polyethylene may be mixed with an inorganic filler up to a loading of about 80 wt. %. The inorganic filler may be selected from the group consisting of: alumina, silica, titania, and combinations thereof.

In one aspect, the separating matrix may include a polymer having a melting temperature greater than or equal to about 215° C.

In one aspect, the polymer may be selected from the group consisting of: polycaprolactam, polybutylene terephthalate (PBT), polymethylpentene (PMP), polyethylene terephthalate (PET), poly(hexamethylene adipamide), cellulose, liquid crystalline polymer, polyether ether ketone (PEEK), polyaramid, fiberglass, and combinations thereof.

In one aspect, the solid-state electrolyte powder may have a melting temperature less than or equal to about 300° C.

In one aspect, the solid-state electrolyte powder may include $Li_{1.9}OHCl_{0.9}$.

In various aspects, the present disclosure provides a method for forming a bicontinuous separating layer for an electrochemical cell. The method may include contacting a solid-state electrolyte liquid-state precursor with a separating matrix having pores. The solid-state electrolyte liquid-state precursor may enter at least a portion of the pores of the separating matrix to form an infiltrated separating matrix. The solid-state electrolyte liquid-state precursor may include a solvent and a solid-state electrolyte powder or a solid-state electrolyte powder precursor. The method may also include heating the infiltrated separating matrix to a temperature greater than or equal to about 25° C. to less than or equal to about 300° C. to remove the solvent and form the bicontinuous separating layer. The bicontinuous separating layer may include a solid-state electrolyte in at least the portion of the pores of the separating matrix.

In one aspect, the contacting and the heating may be repeated until the solid-state electrolyte fills greater than or equal to about 60% of a total porosity of the separating matrix.

In one aspect, the temperature may be a first temperature, and the method may further include at least one of: heating the bicontinuous separating layer to a second temperature greater than or equal to about 100° C. to less than or equal to about 550° C., and heating the bicontinuous separating layer to a third temperature greater than or equal to about 100° C. to less than or equal to about 550° C. while applying a pressure greater than or equal to about 1 MPa to less than or equal to about 300 MPa.

In one aspects, the separating matrix may include aramid, ultra-high molecular weight polyethylene, inorganic fibers, polymethyl pentene, or any combination thereof.

In one aspect, the solid-state electrolyte may include a solid-state electrolyte material selected from the group consisting of: $Li_3PS_4$, $Li_7P_3S_{11}$, $Li_7P_3S_{(1-x)}O_x$ (where $0 \leq x \leq 1.25$), $Li_6PS_5M$ (where M is selected from the group consisting of: chloride (Cl), bromide (Br), iodine (I), and combinations thereof), $Li_4PS_4M$ (where M is selected from the group consisting of: chloride (Cl), bromide (Br), iodine (I), and combinations thereof), $Na_3PS_4$, $Na_{(3-2x)}PS_{(4-x)}Se_x$ (where $0 \leq x \leq 0.1$), and combinations thereof.

In one aspect, the solid-state electrolyte powder precursor may be selected from the group consisting of: $Li_2O$, $Li_2S$, $P_2S_5$, $P_2O_5$, polysulfides, and combinations thereof.

In one aspect, the solvent may be selected from the group consisting of: acetonitrile (ACN), tetrahydrofuran (THF), ethanol (EtOH), methanol (MeOH), n-methylformamide (NMF), ethyl propionate (EP), water ($H_2O$), hydrazine, n-hexane, glycol ethers, ethyl acetate (EA), and combinations thereof.

In one aspect, the temperature may be a first temperature, the separating matrix may include ultra-high molecular weight polyethylene, the ultra-high molecular weight polyethylene may be mixed with an inorganic filler up to a loading of about 80 wt. %, and the method may further include preparing the solid-state electrolyte solution. Preparing the solid-state electrolyte solution may include contacting the solid-state electrolyte powder precursor with a solvent and heating the bicontinuous separating layer to a second temperature greater than or equal to about 100° C. to less than or equal to about 350° C. The solid-state electrolyte powder precursor may be selected from the group consisting of: $Li_2O$, $Li_2S$, $P_2S_5$, $P_2O_5$, polysulfides, and combinations thereof. The solvent may be selected from the group consisting of: acetonitrile (ACN), tetrahydrofuran (THF), ethanol (EtOH), methanol (MeOH), n-methylformamide (NMF), ethyl propionate (EP), water ($H_2O$), hydrazine, n-hexane, glycol ethers, ethyl acetate (EA), and combinations thereof.

In various aspects, the present disclosure provides a method for forming a bicontinuous separating layer for an electrochemical cell. The method may include contacting a solid-state electrolyte powder with a separating matrix having pores to form a physical mixture. The separating matrix may be defined by a polymer having a melting temperature greater than or equal to about 215° C., and the solid-state electrolyte may have a melting temperature greater than or equal to about 300° C. The method may also include heating the physical mixture to a temperature greater than or equal to about 240° C. to less than or equal to about 500° C. to form a melted mixture, mixing the melted mixture to form a precursor mixture, and extruding the precursor mixture to form the bicontinuous separating layer. The bicontinuous separating layer may include a solid-state electrolyte in at least the portion of the pores of the separating matrix.

In one aspect, the polymer may be selected from the group consisting of: polycaprolactam, polybutylene terephthalate (PBT), polymethylpentene (PMP), polyethylene terephthalate (PET), poly(hexamethylene adipamide), cellulose, liquid crystalline polymer, polyether ether ketone (PEEK), polyaramid, fiberglass, and combinations thereof.

In one aspect, the solid-state electrolyte may include $Li_{1.9}OHCl_{0.9}$.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
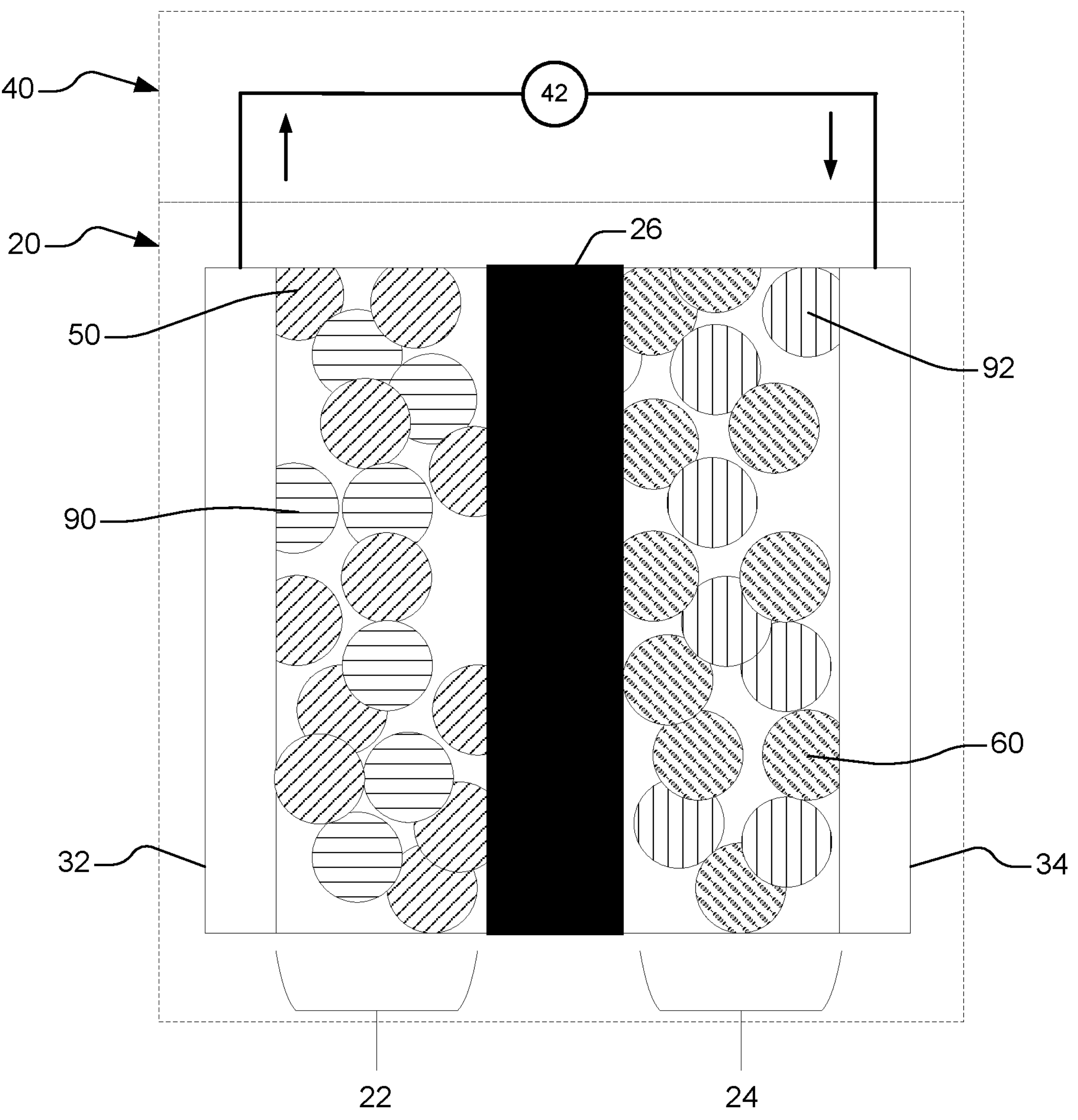
FIG. 1 is an illustration of an example solid-state battery including a bicontinuous separating layer in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology pertains to solid-state batteries (SSBs) including bicontinuous (or hybrid) separating layers, and also, to method of forming and using the same. Solid-state batteries may include at least one solid component, for example, at least one solid electrode, but may also include semi-solid or gel, liquid, or gas components in certain variations. Solid-state batteries may have a bipolar stacking design comprising a plurality of bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of a current collector that is parallel with the first side. The first mixture may include, as the solid-state electroactive material particles, cathode material particles. The second mixture may include, as solid-state electroactive material particles, anode material particles. The solid-state electrolyte particles in each instance may be the same or different.

In other variations, the solid-state batteries may have a monopolar stacking design comprising a plurality of monopolar electrodes where a first mixture of solid-state electroactive material particles (and optional solid-state electrolyte particles) is disposed on both a first side and a second side of a first current collector, where the first and second side are substantially parallel, and a second mixture of solid-state electroactive material particles (and optional solid-state electrolyte particles) is disposed on both a first side and a second side of a second current collector. The first mixture may include, as the solid-state electroactive material particles, cathode material particles. The second mixture may include, as solid-state electroactive material particles, anode material particles. The solid-state electrolyte particles in each instance may be the same or different.

In each instance, the solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance. Although the following discuss focuses on lithium-ion batteries, it should be appreciated that the teachings may be similarly applied to sodium-ion batteries.

An exemplary and schematic illustration of a solid-state electrochemical cell unit (also referred to as a "solid-state battery" and/or "battery") 20 that cycles lithium ions is shown in FIG. 1. The battery 20 includes a negative electrode (e.g., anode) 22, a positive electrode (e.g., cathode) 24, and an electrolyte layer 26 that occupies a space defined between the two or more electrodes 22, 24. The electrolyte layer 26 is a solid-state or semi-solid state separating layer that physically separates the negative electrode 22 from the positive electrode 24, and may be in certain variations, as further detailed below, a bicontinuous (or hybrid) separating layer.

A first or negative electrode current collector 32 may be positioned at or near the negative electrode 22. The first current collector 32 together with the negative electrode 22 may be referred to as a negative electrode assembly. The first current collector 32 may be a metal foil, metal grid or screen, or expanded metal comprising copper or any other appropriate electrically conductive material known to those of skill in the art. A second or positive electrode current collector 34 may be positioned at or near the positive electrode 24. The second current collector 32 with the positive electrode 24 may be referred to as a positive electrode assembly. The second current collector 34 may be a metal foil, metal grid or screen, or expanded metal comprising aluminum or any other appropriate electrically conductive material known to those of skill in the art.

Although not illustrated, the skilled artisan will recognize that in certain variations, the first current collector 32 may be a first bipolar current collector and/or the second current collector 34 may be a second bipolar current collector. For example, the first current collector 32 and/or the second current collector 34 may be cladded foils, for example, where one side (e.g., the first side or the second side) of the current collector 32, 34 includes one metal (e.g., first metal) and another side (e.g., the other side of the first side or the second side) of the current collector 32 includes another metal (e.g., second metal). The cladded foils may include, for example, aluminum-copper (Al—Cu), nickel-copper (Ni—Cu), stainless steel-copper (SS-Cu), aluminum-nickel (Al—Ni), aluminum-stainless steel (Al-SS), and nickel-stainless steel (Ni-SS). In certain variations, the first current collector 32 and/or second current collectors 34 may be pre-coated, such as graphene or carbon-coated aluminum current collectors.

In each instance, the first current collector 32 and the second current collector 34 respectively collect and move free electrons to and from an external circuit 40. For example, an interruptible external circuit 40 and a load device 42 may connect the negative electrode 22 (through the first current collector 32) and the positive electrode 24 (through the second electrode current collector 34). The battery 20 can generate an electric current (indicated by arrows in FIG. 1) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the electrolyte layer 26 towards the positive electrode 24. The electrons flow through the external circuit 40 and the lithium ions migrate across the electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the electrolyte layer 26 back towards the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

Although the illustrated example includes a single positive electrode 24 and a single negative electrode 22, the skilled artisan will recognize that the current teachings apply to various other configurations, including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the solid-state electrolyte layer 26.

In many configurations, each of the negative electrode current collector 32, the negative electrode 22, the electrolyte layer 26, the positive electrode 24, and the positive electrode current collector 34 can be prepared as relatively thin layers (for example, from several microns to a millimeter or less in thickness) and assembled in layers connected in series arrangement to provide a suitable electrical energy, battery voltage and power package, for example, to yield a Series-Connected Elementary Cell Core ("SECC"). In various other instances, the battery 20 may further include electrodes 22, 24 connected in parallel to provide suitable electrical energy, battery voltage, and power for example, to yield a Parallel-Connected Elementary Cell Core ("PECC").

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

With renewed reference to FIG. 1, the bicontinuous separating layer 26 provides electrical separation—preventing physical contact—between the negative electrode 22 and the positive electrode 24. The bicontinuous separating layer 26 also provides a minimal resistance path for internal passage of ions. In various aspects, the bicontinuous separating layer 26 may be a continuous network including two contiguous, interpenetrating networks. For example, the bicontinuous separating layer 26 may include a solid-state electrolyte (i.e., second phase) that is disposed within pores of a porous separator (or porous matrix or scaffold) (i.e., first phase). The pores of the porous separator may be interconnected. The porous separator may have a porosity greater than or equal to about 30 vol. % to less than or equal to about 80 vol. %, and in certain aspects, optionally greater than or equal to about 40 vol. % to less than or equal to about 60 vol. %; and the solid-state electrolyte may preferably fill greater than or equal to about 20% to less than or equal to about 100%, optionally greater than or equal to about 50% to less than or equal to about 100%, optionally greater than or equal to about 60% to less than or equal to about 100%, optionally greater than or equal to about 80% to less than or equal to about 100%, and in certain aspects, optionally greater than or equal to about 90% to less than or equal to about 100%, of a total porosity of the porous separator. As further detailed below, the solid-state electrolyte is formed in and confined by the pores of the porous separator. For example, an average pore diameter for the pores of the porous separator may be greater than or equal to about 0.03 micrometers (μm) to less than or equal to about 1 μm, and an average particle size for the solid-state electrolyte may be greater than or equal to about 0.03 μm to less than or equal to about 1 μm.

As the pores of the porous separator are filled with the solid-state electrolyte the permeability of the separating layer 26 decreases. For example, traditional separators that are impregnated with liquid electrolyte may have a Gurley number greater than or equal to about 15 s/100 cc, while the bicontinuous separating layer 26 in accordance with various aspects of the present disclosure may have a Gurley number greater or equal to about 300 s/100 cc, optionally greater than or equal to about 500 s/100 cc, and in certain aspects, optionally greater than or equal to about 1,000 s/100 cc. The Gurley number is defined as a time it takes for 100 cc of air to flow through the substrate. Lower Gurley numbers reflect a high permeability, while higher Gurley numbers reflect a lower permeability. Further, traditional separators that are impregnated with liquid electrolyte may have an areal resistance greater than or equal to about 2 $\Omega \cdot cm^2$ to less than or equal to about 20 $\Omega \cdot cm^2$, while the bicontinuous separating layer 26 in accordance with various aspects of the present disclosure may have an areal resistance greater than or equal to about 2 $\Omega \cdot cm^2$ to less than or equal to about 100 $\Omega \cdot cm^2$. A thickness of the bicontinuous separating layer 26 may be defined by porous separator. An average thickness of the porous separator may be, for example, greater than or equal to about 10 μm to less than or equal to about 100 μm.

In various aspects, the porous separator may include a thermoset polymer, such as an aramid. In other variations, the porous separator may include non-woven, laid fibers having high melting or thermal degradation temperatures and an average void space between the fibers of less than about 1 μm. For example, the non-woven, laid fibers may include cellulose, aramid, and/or Kevlar® as detailed in U.S. Pat. No. 10,734,673, titled "Ionically-Conductive Reinforced Glass Ceramic Separators/Solid Electrolytes", issued Aug. 4, 2022 to Thomas A. Yersak and James R. Salvador, the entire disclosure of which is hereby incorporated by reference. In still other variations, the porous separator may include a ceramic-filled, ultra-high molecular weight polyethylene (UHMWPE) (which includes an ultra-high molecular weight polyethylene mixed with an inorganic filler (e.g., alumina ($Al_2O_3$), silica, and/or titania ($TiO_2$)) up to a loading of about 80 wt. % so as to minimize thermal shrinkage). The ultra-high molecular weight polyethylene (UHMWPE) may have a molecular mass between about 3.5 million amu and about 7.5 million amu. In still other variations, the porous separator may be defined by inorganic fibers (e.g., glass fibers, glass-ceramic fibers, ceramic papers, alumina fibers). In still other variations, the porous separator may include polymethyl pentene, polycaprolactam (Nylon 6), polybutylene terephthalate (PBT), polymethylpentene (PMP), polyethylene terephthalate (PET), poly (hexamethylene adipamide) (Nylon 66), cellulose, liquid crystalline polymers (such as Vectra® and/or Vectran™M), polyether ether ketone (PEEK), polyaramid (Kevlar®, Nomex®), fiberglass reinforced polymer ("fiberglass"), and combinations thereof.

In various aspects, the solid-state electrolyte may include a plurality of solid-state electrolyte particles. The solid-state electrolyte particles may be defined by one or more solid-state electrolyte materials may include lithium or sodium containing sulfide-based materials. The sulfide-based materials may include, for example, a pseudobinary sulfide, a pseudoternary sulfide, and/or a pseudoquaternary sulfide. Example pseudobinary sulfide systems include $Li_2S$—$P_2S_5$ systems (such as, $Li_3PS_4$, $Li_7P_3S_{11}$, and $Li_{9.6}P_3S_{12}$), $Li_2S$—$SnS_2$ systems (such as, $Li_4SnS_4$), $Li_2S$—$SiS_2$ systems, $Li_2S$—$GeS_2$ systems, $Li_2S$—$B_2S_3$ systems, $Li_2S$—$Ga_2S_3$ system, $Li_2S$—$P_2S_3$ systems, and $Li_2S$—$Al_2S_3$ systems. Example pseudoternary sulfide systems include $Li_2O$—$Li_2S$—$P_2S_5$ systems, $Li_2S$—$P_2S_5$—$P_2O_5$ systems, $Li_2S$—$P_2S_5$-$GeS_2$ systems (such as, $Li_{3.25}Ge_{0.25}P_{0.75}S_4$ and $Li_{10}GeP_2Si_2$), $Li_2S$—$P_2S_5$—LiX systems (where X is one of F, Cl, Br, and I) (such as, $Li_6PS_5Br$, $Li_6PS_5Cl$, $L_7P_2S_8I$, and $Li_4PS_4I$), $Li_2S$—$As_2S_5$—$SnS_2$ systems (such as, $Li_{3.833}Sn_{0.833}As_{0.166}S_4$), $Li_2S$—$P_2S_5$—$Al_2S_3$ systems, $Li_2S$—LiX—$SiS_2$ systems (where X is one of F, Cl, Br, and I), $0.4LiI \cdot 0.6Li_4SnS_4$, and $Li_{11}Si_2PS_{12}$. Example pseudoquaternary sulfide systems include $Li_2O$—$Li_2S$—$P_2S_5$—$P_2O_5$ systems, $Li_{9.54}Si_{1.74}P_{1.44}S_{11.7}Cl_{0.3}$, $Li_7P_{2.9}Mn_{0.1}S_{10.7}I_{0.3}$, and $Li_{10.35}[Sn_{0.27}Si_{1.08}]P_{1.65}S_{12}]$. In certain variations, the solution-processable solid-state electrolyte material may be selected from the group consisting of: $Li_3PS_4$, $Li_7P_3S_{11}$, $Li_7P_3S_{(11-x)}O_x$ (where $0 \leq x \leq 1.25$), $Li_6PS_5M$ (where M is chloride (Cl), bromide (Br), iodine (I), and combinations thereof), $Li_4PS_4M$ (where M is chloride (Cl), bromide (Br), iodine (I), and combinations thereof), $Na_3PS_4$, $Na_{(3-2x)}PS_{(4-x)}Se_x$ (where $0 \leq x \leq 0.1$), and combinations thereof. In certain variations, the solid-state electrolyte may include $Li_{1.9}OHCl_{0.9}$.

In certain variations, the porous separator may include, for example, a thermoset polymer, such as an aramid. In other variations, the porous separator may include non-woven, laid fibers having high melting or thermal degradation temperatures. The non-woven, laid fiber separator may be thermally and chemically stable for at least one hour at temperatures up to about 450° C. In still other variations, the porous separator may include a ceramic-filled, ultra-high molecular weight polyethylene (UHMWPE) (which includes an ultra-high molecular weight polyethylene mixed with an inorganic filler (e.g., alumina, silica, and/or titania) up to a loading of about 80 wt. % so as to minimize thermal shrinkage). The ceramic-filled, ultra-high molecular weight polyethylene (UHMWPE) separator may be thermally and chemically stable for at least one hour at temperatures up to about 300° C. In still other variations, the porous separator may be defined by inorganic fibers (e.g., ceramic papers, alumina fibers). In still other variations, the porous separator may include polymethyl pentene. In such variations, where the porous separator includes the thermoset polymer (such as an aramid) and/or non-woven, laid fibers and/or ceramic-filled, ultra-high molecular weight polyethylene (UHMWPE) separator and/or the ceramic fibers and/or the polymethyl pentene, the solid-state electrolyte may include a plurality of solid-state electrolyte particles defined by one or more solution-processable solid-state electrolyte materials. The one or more solution-processable solid-state electrolyte materials may include lithium or sodium containing sulfide-based materials, as detailed above.

In other variations, the porous separator may be defined by polymers having higher melting temperatures (e.g., greater than about 200° C., and in certain aspects, optionally greater than about 215° C.). For example, the porous separator may include polycaprolactam (Nylon 6) having a melting point of greater than or equal to about 215° C. to less than or equal to about 220° C., polybutylene terephthalate (PBT) having a melting temperature of about 223° C., polymethylpentene (PMP) having a melting temperature of about 240° C., polyethylene terephthalate (PET) having a melting temperature of about 260° C., poly(hexamethylene adipamide) (Nylon 66) having a melting point greater than or equal to about 263° C. to less than or equal to about 269° C., cellulose having a melting point greater than or equal to about 260° C. to less than or equal to about 270° C., liquid crystalline polymers (such as Vectra having a melting point of about 280° C. and/or Vectran having a melting points of about 350° C.), polyether ether ketone (PEEK) having a melting temperature of about 343° C., polyaramid (Kevlar®, Nomex®) having a melting point of about 500° C., fiberglass having a melting point of about 1,135° C., and combinations thereof. In such variations, the solid-state electrolyte may include $Li_{1.9}OHCl_{0.9}$ having a melting temperature of about 300° C.

The combination of porous separators and solid-state electrolytes may address many of the challenges often associated with traditional solid-state electrolyte layers, like limited energy density as the result of comparatively large thickness (e.g., greater than about 100 μm). The combination of porous separators and solid-state electrolytes may also limit lithium plating within pores and cracks and along grain boundaries in the solid-state electrolyte. However, free-flowing solid-state electrolyte powders are often too large to fit into the sub-micron size pores of the porous separators, and the solution processing of solid-state electrolytes often require heat treatments that can destroy the porous separators. For example, the porous separators often have average pore diameters greater than or equal to about 0.01 μm to less than or equal to about 0.3 μm, while free-flowing solid-state electrolyte powders typically have average particle sizes greater than or equal to about 0.5 μm to less than or equal to about 10 μm.

Figure 2:
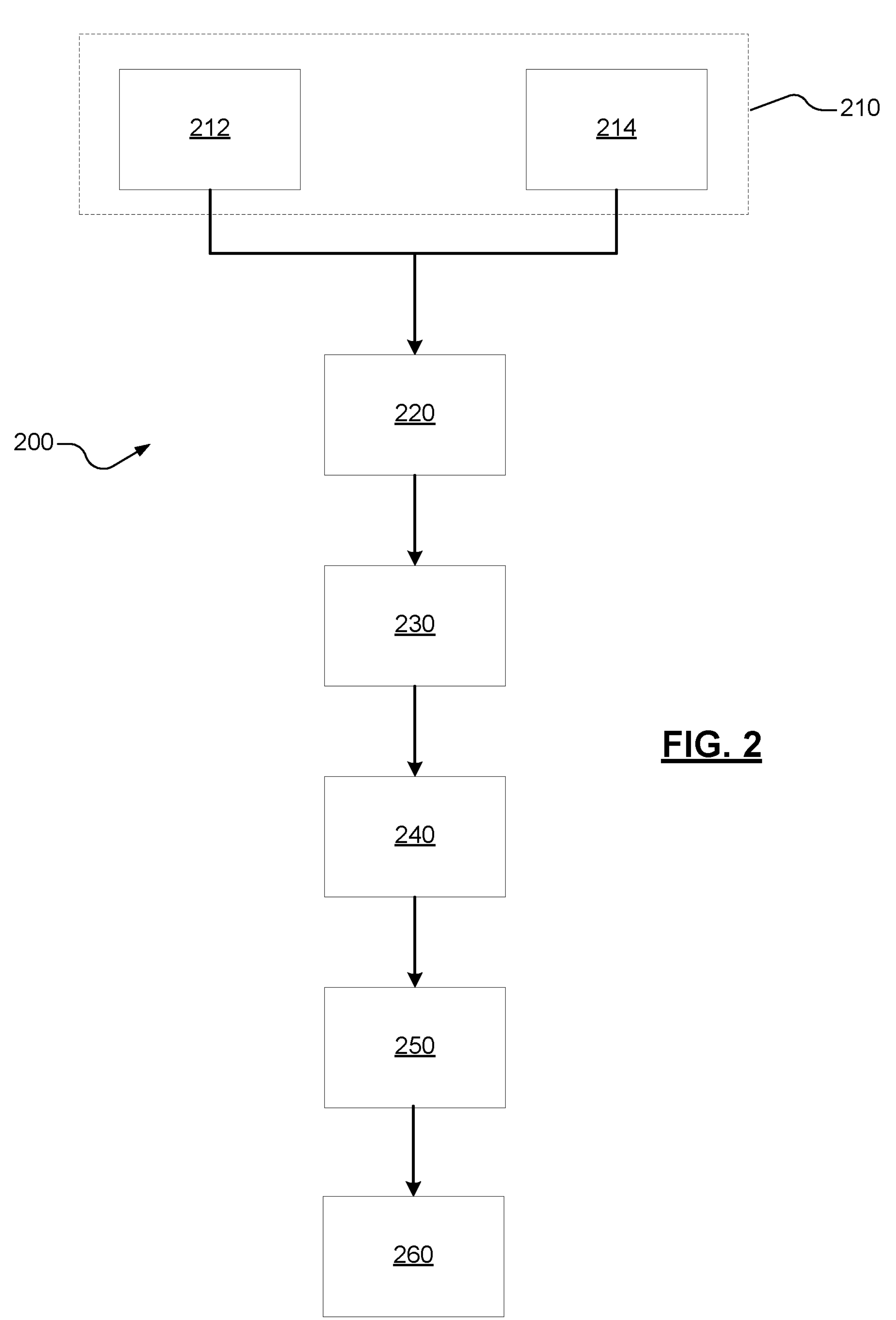
FIG. 2 is a flowchart illustrating an example method for preparing an example bicontinuous separating layer for a solid-state battery in accordance with various aspects of the present disclosure.

The present disclosure provides methods for preparing bicontinuous separating layers including two contiguous, interpenetrating networks: a porous separator filled with a solid-state electrolyte. For example, FIG. 2 illustrates an example method 200 for preparing a bicontinuous separating layer, like the bicontinuous separating layer 26 illustrated in FIG. 1. The method 200 may include contacting 230 a solid-state electrolyte solution with the porous separator to form a precursor infiltrated (or impregnated) porous separator. In certain variations, the contacting 230 may include drop casting and/or vacuum processing. In certain variations, the contacting 230 may occur in an inert environment (e.g., dry room) so as to limit or avoid oxidation of the polymeric materials defining the porous separator.

The method 200 may include heating 240 the precursor infiltrated porous separator to remove (e.g., boil off) the solvent and form an infiltrated (or impregnated) porous separator (i.e., a bicontinuous separating layer). For example, in certain variations, the precursor infiltrated porous separator may be heated 240 to a first temperature greater than or equal to about 25° C. to less than or equal to about 300° C., optionally greater than or equal to about 130° C. to less than or equal to about 200° C. and in certain aspects, optionally about 130° C. The first temperature may be held for a first period greater than or equal to about 10 minutes to less than or equal to about 12 hours, optionally greater than or equal to about 1 hour to less than or equal to about 2 hours, and in certain aspects, optionally about 1 hour.

In certain variations, the method 200 includes repeating method steps 230 and 240 until a desired loading of the infiltrated porous separator is achieved. The porous separator has an interconnected porous structure. For example, the porous separator may have a porosity greater than or equal to about 30 vol. % to less than or equal to about 80 vol. %, and in certain aspects, optionally greater than or equal to about 40 vol. % to less than or equal to about 60 vol. %, and the solid-state electrolyte may preferably fill greater than or equal to about 20% to less than or equal to about 100%, and in certain aspects, optionally greater than or equal to about 50% to less than or equal to about 80%, of a total porosity of the porous separator.

As detailed above, the porous separator may be a thermally and dimensionally stable separator at temperatures up to about 240° C., and in certain aspects, optionally about 300° C. In certain variations, the method 200 may include preparing 220 the porous separator. Preparing 220 the porous separator may include, for example, applying an oxide coating to one or more surfaces of the porous separator using an atomic layer deposition coating process. The oxide layer may improve the wettability of the porous separator and thereby the infiltration of the solid-state electrolyte. In certain variations, the oxide layer may include $Al_2O_3$, $TiO_2$, $ZrO_2$, and combinations thereof. Although illustrated consecutively, it should be recognized that in certain variations, the preparing 210 of the solid-state electrolyte solution and the preparing 220 of the porous separator may occur concurrently. Further still, in certain variations, the preparing 220 of the porous separator may occur prior to the preparing 210 of the of the solid-state electrolyte solution.

In certain variations, the method 200 may include preparing 210 the solid-state electrolyte solution or liquid-state precursor. In certain variations, the solid-state electrolyte solution may be prepared by contacting 212 a solid-state electrolyte powder and a solvent. For example, the solid-state electrolyte powder may be dissolved in the solvent. In certain variations, the solid-state electrolyte powder may include a plurality of solid-state electrolyte particles. As discussed above, the solid-state electrolyte particles may be defined by one or more solution-processable solid-state electrolyte materials. In other variations, the solid-state electrolyte solution may be prepared by contacting 214 a solid-state electrolyte powder precursor to the solvent. For example, the solid-state electrolyte powder precursor may be dissolved in the solvent. In certain variations, the solid-state electrolyte precursor may include, for example, $Li_2O$, $Li_2S$, $P_2S_5$, $P_2O_5$, polysulfides, and combinations thereof. In each variation, the solvent may include acetonitrile (ACN), tetrahydrofuran (THF), methanol (MeOH), ethanol (EtOH), n-methylformamide (NMF), ethyl propionate (EP), water ($H_2O$), hydrazine, n-hexane, glycol ethers (e.g., diglyme/DEGDME, triglyme and/or tetraglyme), ethyl acetate (EA), and combinations thereof.

In certain variations, the method 200 may further include a second heat treatment. For example, the method 200 may include heating (or annealing) 250 the infiltrated porous separator to obtain desired solid-state electrolyte phase ionic conductivity. The infiltrated porous separator may be heated 250 to a second temperature greater than or equal to about 100° C. to less than or equal to about 550° C., and in certain aspects, optionally greater than or equal to about 200° C. to less than or equal to about 300° C. The second temperature may be held for a second period greater than or equal to about 1 minute to less than or equal to about 2 hours, optionally greater than or equal to about 5 minutes to less than or equal to about 1 hours, and in certain aspects, optionally greater than or equal to about 5 minutes about 10 minutes. The heating 250 may work to obtain the desired solid-state electrolyte phase ionic conductivity by reducing the grain boundary impedance by sintering and precipitating superionic conducting solid-state electrolyte phases. In certain variations, the desired solid-state electrolyte phase ionic conductivity may be greater than or equal to about $2.5\times10^{-5}$ S/cm S/cm at 25° C.

In certain variations, the method 200 may further include (in addition to, or instead of, the second heat treatment 250) hot pressing 260 the infiltrated porous separator to reduce grain boundary impedance via viscoplastic flow and the precipitation of superionic conducting solid-state electrolyte phases. The hot pressing 260 may include heating the infiltrated porous separator to a third temperature. In certain instances, the heating the infiltrated porous separator to the third temperature may occur while a pressure is applied. The third temperature may greater than or equal to about 100° C. to less than or equal to about 550° C., and in certain aspects, optionally greater than or equal to about 200° C. to less than or equal to about 300° C. The applied pressure may be greater than or equal to about 0.1 MPa to less than or equal to about 300 MPa, optionally greater than or equal to about 1 MPa to less than or equal to about 300 MPa, and in certain aspects, optionally greater than or equal to about 1 MPa to less than or equal to about 10 MPa. The heat (and optionally the pressure) may be applied for a third period greater than or equal to about 1 minute to less than or equal to about 2 hours, and in certain aspects, optionally greater than or equal to about 5 minutes to less than or equal to about 10 minutes. Although not illustrated, it should be appreciated that, in certain variations, the method 200 may include a cooling step between the second heat treatment 250 and the hot pressing 260. For example, the infiltrated porous separator may be passively cooled to about ambient temperature or infiltration temperature (e.g., first temperature) prior to the hot pressing 260.

Figure 3:
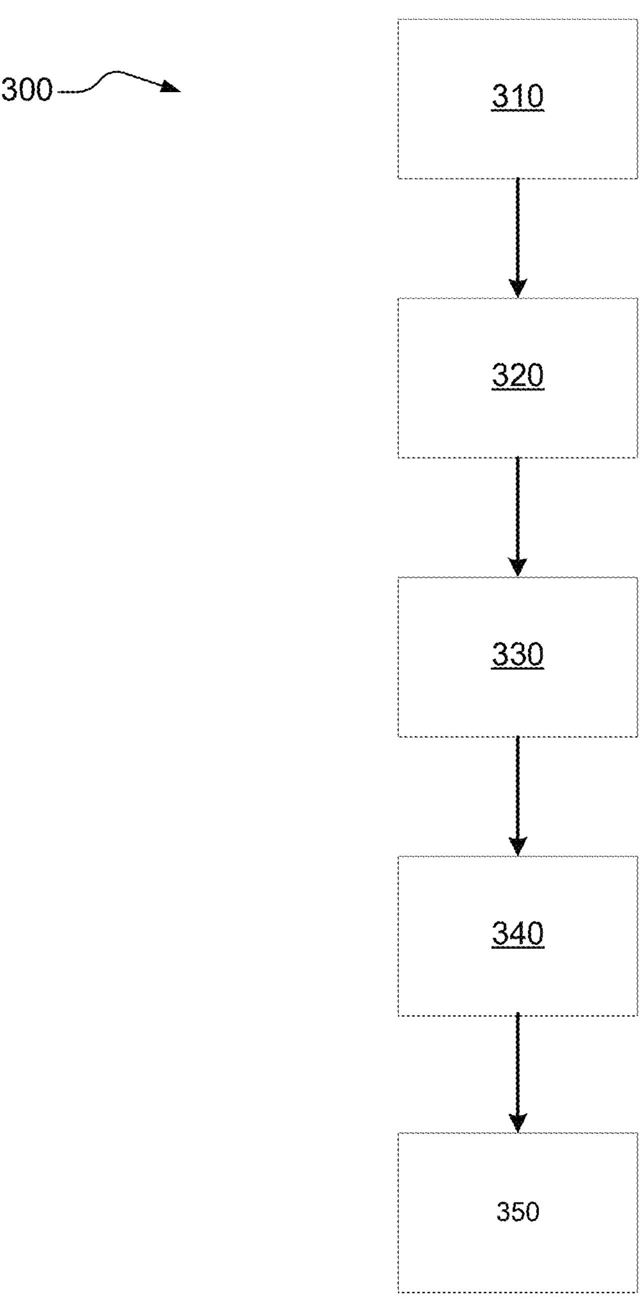
FIG. 3 a flowchart illustrating another example method for preparing an example bicontinuous separating layer for a solid-state battery in accordance with various aspects of the present disclosure.

FIG. 3 illustrates an example method 300 for preparing a bicontinuous separating layer, where the solid-state electrolyte has a melting point less than about 300° C., and the porous separator includes polymers having melting point greater than about 200° C., and in certain aspects, optionally greater than about 215° C. That is, the solid-state electrolyte has a melting point that is low compared to common solid-state electrolytes, and the porous separator has a melting point that is high compared to common porous separators. For example, the solid-state electrolyte may include $Li_{1.9}OHCl_{0.9}$ having a melting temperature of about 300° C. and the porous separator may include polycaprolactam (Nylon 6) having a melting point of greater than or equal to about 215° C. to less than or equal to about 220° C., polybutylene terephthalate (PBT) having a melting temperature of about 223°° C., polymethylpentene (PMP) having a melting temperature of about 240°° C., polyethylene terephthalate (PET) having a melting temperature of about 260° C., poly (hexamethylene adipamide) (Nylon 66) having a melting point greater than or equal to about 263°° C. to less than or equal to about 269° C., cellulose having a melting point greater than or equal to about 260° C. to less than or equal to about 270° C., liquid crystalline polymers (such as Vectra® having a melting point of about 280° C. and/or Vectran™ having a melting points of about 350° C.), polyether ether ketone (PEEK) having a melting temperature of about 343° C., polyaramid (Kevlar®, Nomex®) having a melting point of about 500° C., fiberglass having a melting point of about 1,135° C., and combinations thereof. The higher-melting point polymers may be immiscible in solvents like those used in method 200.

The method 300 may include contacting 310 the low-melting point solid-state electrolyte with the high-melting point polymers to form a physical mixture. In certain variations, the contacting 310 may occur using a physical mixing process, like ball milling, stirring, grinding, and the like. The method 300 may include heating 320 the physical mixture. For example, the physical mixture may be heated 320 to a first temperature greater than or equal to about 240° C. to less than or equal to about 500° C., and in certain aspects, optionally greater than or equal to about 300° C. to less than or equal to about 500° C. In certain variations, the heating 320 may occur in a vacuum so that trapped air is removed and also to facilitate melt flow so as to remove voids. The method 300 may further include mixing 330 the heated (or melted) physical mixture and disposing the mixture to form the bicontinuous separating layer or sheet. For example, in certain variations, the heated physical mixture may be mixed using a screw mixer and extruded using the same to form the bicontinuous separating layer. In certain variations, the method 300 may include mixing 330 the heated (or melted) physical mixture for a period greater than or equal to about 0 minutes to less than or equal to about 1 hour.

In certain variations, the method 300 may further include hot pressing 340 the bicontinuous separating layer to reduce grain boundary impedance via viscoplastic flow and the precipitation of superionic conducting solid-state electrolyte phases. The hot pressing 340 may include heating the bicontinuous separating layer to a second temperature. In certain variations, the hot pressing 340 may include heating the bicontinuous separating layer while a pressure is applied. The second temperature may greater than or equal to about 100° C. to less than or equal to about 550° C., and in certain aspects, optionally greater than or equal to about 200° C. to less than or equal to about 300° C. The applied pressure may be greater than or equal to about 0.1 MPa to less than or equal to about 300 MPa, optionally greater than or equal to about 1 MPa to less than or equal to about 300 MPa, and in certain aspects, optionally greater than or equal to about 1 MPa to less than or equal to about 10 MPa. The heat (and optionally the pressure) may be applied for a period greater than or equal to about 1 minute to less than or equal to about 2 hours, and in certain aspects, optionally greater than or equal to about 5 minutes to less than or equal to about 10minutes.

In certain variations, the method 300 may further include (in addition to, or instead of the hot pressing 340) heating (or annealing) 350 the bicontinuous separating layer to obtain desired solid-state electrolyte phase ionic conductivity. For example, the bicontinuous separating layer may be heated 350 to a second temperature greater than or equal to about 100° C. to less than or equal to about 550° C., and in certain aspects, optionally greater than or equal to about 200° C. to less than or equal to about 300° C. The second temperature may be held for a second period greater than or equal to about 1 minute to less than or equal to about 2 hours, optionally greater than or equal to about 5 minutes to less than or equal to about 1 hours, and in certain aspects, optionally greater than or equal to about 5 minutes about 10 minutes. The heating 350 may work to obtain the desired solid-state electrolyte phase ionic conductivity by reducing the grain boundary impedance by sintering and precipitating superionic conducting solid-state electrolyte phases. In certain variations, the desired solid-state electrolyte phase ionic conductivity may be greater than or equal to about $2.5\times10^{-5}$ S/cm at 25° C. Although not illustrated, it should be appreciated that, in certain variations, the method 300 may include a cooling step between the hot pressing 340 and the annealing 350. For example, the bicontinuous separating layer may be passively cooled to about ambient temperature) prior to the annealing 350.

With renewed reference to FIG. 1, the negative electrode 22 may be formed from a lithium host material that is capable of functioning as a negative terminal of a lithium-ion battery. In various aspects, as illustrated, the negative electrode 22 may be defined by a plurality of negative electroactive material particles 50. Such negative electroactive material particles 50 may be disposed in one or more layers so as to define the three-dimensional structure of the negative electrode 22. In certain variations, as illustrated, the negative electrode 22 may be a composite electrode comprising a first plurality of solid-state electrolyte particles 90 in combination with the negative electroactive material particles 50. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50, and greater than or equal to about 0 wt. % to less than or equal to about 50 wt. %, and in certain aspects, optionally greater than or equal to about 5 wt. % to less than or equal to about 20 wt. %, of the first plurality of solid-state electrolyte particles 90. In each instance, the negative electrode 22 (including the one or more layers) may have an average thickness greater than or equal to about 0 nm to less than or equal to about 500 μm, optionally greater than or equal to about 1 μm to less than or equal to about 500 μm, and in certain aspects, optionally greater than or equal to about 10 μm to less than or equal to about 200 μm.

In certain variations, the first plurality of solid-state electrolyte particles 90 may be the same as, or different from, the solid-state electrolyte of the bicontinuous separating layer 26. In other variations, the first plurality of solid-state electrolyte particles 90 may include, for example, oxide-based materials, metal-doped or aliovalent-substituted oxide materials, nitride-based materials, hydride-based materials, halide-based materials, and/or borate-based materials.

The oxide-based materials may include, for example, garnet ceramics, LISICON-type oxides, NASICON-type oxides, and Perovskite type ceramics. The garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$(LAGP) (where 0≤x≤2), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), and combinations thereof.

The metal-doped or aliovalent-substituted oxide materials may include, for example, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where 0<x<2 and 0<y<3), and combinations thereof. The nitride-based materials may include, for example, $Li_3N$, $Li_7PN_4$, $LiSi_2N_3$, and combinations thereof. The hydride-based particles may include, for example, $LiBH_4$, $LiBH_4$—LiX (where x=Cl, Br, or I), $LiNH_2$, $Li_2NH$, $LiBH_4$—$LiNH_2$, $Li_3AlH_6$, and combinations thereof. The halide-based materials may include, for example, LiI, $Li_3InCl_6$, $Li_2CdC_{14}$, $Li_2MgCl_4$, $LiCdI_4$, $Li_2ZnI_4$, $Li_3OCl$, $Li_3YCl_6$, $Li_3YBr_6$, and combinations thereof. The borate-based materials may include, for example, $Li_2B_4O_7$, $Li_2O$—$B_2O_3$—$P_2O_5$, and combinations thereof.

In various aspects, the negative electroactive material particles 50 may include a lithium-containing negative electroactive material, such as a lithium alloy and/or a lithium metal. For example, in certain variations, the negative electrode 22 may be defined by a lithium metal foil. In other variations, the negative electroactive material particles 50 may include, for example only, a carbonaceous negative electroactive material (such as, graphite, hard carbon, soft carbon, and the like) and/or a metallic negative electroactive material (such as tin, aluminum, magnesium, germanium, and alloys thereof, and the like). In further variations, the negative electroactive material particles 50 may include a silicon-based negative electroactive material.

In still further variations, although not illustrated, the negative electrode 22 may be a composite electrode including a combination of negative electroactive materials. For example, the negative electrode 22 may include a first plurality of negative electroactive material particles and a second plurality of negative electroactive material particles. In certain variations, a ratio of the first negative electroactive material defining the first plurality of negative electroactive material particles to the second negative electroactive material defining the second plurality of negative electroactive material particles may be greater than or equal to about 5:95 to less than or equal to about 95:5. The first and second negative electroactive materials may be independently selected from the group including, for example, lithium, lithium alloys, carbonaceous negative electroactive materials (such as, graphite, hard carbon, soft carbon, and the like), metallic negative electroactive materials (such as tin, aluminum, magnesium, germanium, and alloys thereof, and the like), and silicon-based negative electroactive material.

Although not illustrated, it should be understood that, in certain variations, the negative electrode 22 may further include an electronically conductive material (i.e. conductive additive) that provides an electron conductive path and/or a polymeric binder material that improves the structural integrity of the negative electrode 22. For example, the negative electrode 22 may include greater than or equal to about 30 wt. % to less than or equal to about 98 wt. %, and in certain aspects, optionally greater than or equal to about 60 wt. % to less than or equal to about 95 wt. %, of the negative electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), polytetrafluoroethylene (PTFE), polyacrylic acid (PAA), blends of polyvinylidene fluoride and polyhexafluoropropene, polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include, for example, carbon-based materials, powdered nickel or other metal particles, or conductive polymers. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The positive electrode 24 is formed from a lithium-based active material that is capable of undergoing lithium intercalation and deintercalation, alloying and dealloying, or plating and stripping, while functioning as the positive terminal of a lithium-ion battery. In various aspects, as illustrated, the positive electrode 24 may be defined by a plurality of positive electroactive material particles 60. Such positive electroactive material particles 60 may be disposed in one or more layers so as to define the three-dimensional structure of the positive electrode 24. In certain variations, as illustrated, the positive electrode 24 may be a composite electrode comprising a second plurality of solid-state electrolyte particles 92 in combination with the positive electroactive material particles 60. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 92. In each instance, the positive electrode 24 (including the one or more layers) may have an average thickness greater than or equal to about 1 μm to less than or equal to about 500 μm, and in certain aspects, optionally greater than or equal to about 10 μm to less than or equal to about 200 μm.

The second plurality of solid-state electrolyte particles 92 may be the same as, or different from, the first plurality of solid-state electrolyte particles 90. For example, in certain variations, like the solid-state electrolyte particles 90, the solid-state electrolyte particles 92 may be the same as, or different from, the solid-state electrolyte of the bicontinuous separating layer 26 and/or may include oxide-based particles, metal-doped or aliovalent-substituted oxide particles, nitride-based particles, hydride-based particles, halide-based particles, and/or borate-based particles.

In various aspects, the positive electroactive material particles 60 may include a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material particles 60 include an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material particles 60 include a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material particles 60 include a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material particles 60 includes a favorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof.

In still further variations, although not illustrated, the positive electrode 24 may be a composite electrode including a combination of positive electroactive materials. For example, the positive electrode 24 may include a first plurality of positive electroactive material particles and a second plurality of positive electroactive material particles. In certain variations, a ratio of the first positive electroactive material defining the first plurality of positive electroactive material particles to the second positive electroactive material defining the second plurality of positive electroactive material particles may be greater than or equal to about 5:95 to less than or equal to about 95:5. The first and second positive electroactive materials may be independently selected from the group including, for example, layered oxides, olivine-type oxides, monoclinic-type oxides, spinel-type oxide, and/or favorite.

Although not illustrated, it should be understood that, in certain variations, the positive electrode 24 may further include an electronically conductive material (i.e. conductive additive) that provides an electron conductive path and/or a polymeric binder material that improves the structural integrity of the positive electrode 24. For example, the positive electrode 24 may include greater than or equal to about 30 wt. % to less than or equal to about 98 wt. %, and in certain aspects, optionally greater than or equal to about 60 wt. % to less than or equal to about 95 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder. The conductive additive and/or binder material as included in the positive electrode 24 may be the same as or different from the conductive additive and/or binder material as included in the negative electrode 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bicontinuous separating layer for an electrochemical cell, the bicontinuous separating layer comprising:

a separating matrix having pores with an average pore diameter being greater than or equal to about 0.03 micrometers to less than or equal to about 1 micrometer; and a solid-state electrolyte disposed in at least a portion of the pores of the separating matrix, an average particle size for the solid-state electrolyte being greater than or equal to about 0.03 micrometers to less than or equal to about 1 micrometer, the bicontinuous separating layer having an ionic conductivity greater than or equal to about $2.5\times10^{-5}$ S/cm at 25° C.

2. The bicontinuous separating layer of claim 1, wherein the separating matrix has a porosity greater than or equal to about 30 vol. % to less than or equal to about 80 vol. %, and the solid-state electrolyte occupies greater than or equal to about 60% of a total porosity of the separating matrix.

3. The bicontinuous separating layer of claim 1, wherein the bicontinuous separating layer has a Gurley number greater or equal to about 300 s/100cc, and an areal resistance greater than or equal to about 2 $\Omega\cdot cm^2$ to less than or equal to about 100 $\Omega\cdot cm^2$.

4. The bicontinuous separating layer of claim 1, wherein a thickness of the bicontinuous separating layer is defined by the separating matrix and an average thickness of the separating matrix is greater than or equal to about 10 micrometers to less than or equal to about 100 micrometers.

5. The bicontinuous separating layer of claim 1, where the separating matrix comprises one or more of: aramid, ultra-high molecular weight polyethylene, inorganic fibers, polymethyl pentene, or any combination thereof.

6. The bicontinuous separating layer of claim 5, wherein the solid-state electrolyte comprises a solid-state electrolyte material selected from the group consisting of: $Li_3PS_4$, $Li_7P_3S_{11}$, $Li_7P_3S_{(11-x)}O_x$ (where $0\leq x\leq 1.25$), $Li_6PS_5M$ (where M is selected from the group consisting of: chloride (Cl), bromide (Br), iodine (I), and combinations thereof), $Li_4PS_4M$ (where M is selected from the group consisting of: chloride (Cl), bromide (Br), iodine (I), and combinations thereof), $Na_3PS_4$, $Na_{(3-2x)}PS_{(4-x)}Se_x$ (where $0\leq x\leq 0.1$), and combinations thereof.

7. The bicontinuous separating layer of claim 5, wherein the separating matrix comprises the ultra-high molecular weight polyethylene, and the ultra-high molecular weight polyethylene is mixed with an inorganic filler up to a loading of about 80 wt. %, the inorganic filler being selected from the group consisting of: alumina, silica, titania, and combinations thereof.

8. The bicontinuous separating layer of claim 1, wherein the separating matrix comprises a polymer having a melting temperature greater than or equal to about 215° C.

9. The bicontinuous separating layer of claim 8, wherein the polymer is selected from the group consisting of: polycaprolactam, polybutylene terephthalate (PBT), polymethylpentene (PMP), polyethylene terephthalate (PET), poly(hexamethylene adipamide), cellulose, liquid crystalline polymer, polyether ether ketone (PEEK), polyaramid, fiberglass, and combinations thereof.

10. The bicontinuous separating layer of claim 8, wherein the solid-state electrolyte has a melting temperature less than or equal to about 300° C.

11. The bicontinuous separating layer of claim 10, wherein the solid-state electrolyte comprises $Li_{1.9}OHCl_{0.9}$.

12. The bicontinuous separating layer of claim 1, where the separating matrix comprises polymethyl pentene.

* * * * *